United States Patent
Shinnishi et al.

(10) Patent No.: US 8,862,473 B2
(45) Date of Patent: Oct. 14, 2014

(54) COMMENT RECORDING APPARATUS, METHOD, PROGRAM, AND STORAGE MEDIUM THAT CONDUCT A VOICE RECOGNITION PROCESS ON VOICE DATA

(75) Inventors: Makoto Shinnishi, Kawasaki (JP); Soichiro Iga, Machida (JP); Masashi Nakatomi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1015 days.

(21) Appl. No.: 12/939,646

(22) Filed: Nov. 4, 2010

(65) Prior Publication Data

US 2011/0112835 A1      May 12, 2011

(30) Foreign Application Priority Data

Nov. 6, 2009    (JP) ................. 2009-255361

(51) Int. Cl.
    *G10L 15/18*      (2013.01)
    *G06F 17/27*      (2006.01)

(52) U.S. Cl.
    CPC ............ *G10L 15/18* (2013.01); *G06F 17/2755* (2013.01)
    USPC ........................................................ 704/270

(58) Field of Classification Search
    USPC ................................................. 704/235, 270
    See application file for complete search history.

(56) References Cited

U.S. PATENT DOCUMENTS 5,794,249 A     8/1998   Orsolini et al.
5,855,000 A *   12/1998   Waibel et al. ................. 704/235

(Continued)

FOREIGN PATENT DOCUMENTS

| CN | 1245317 A | 2/2000 |
|---|---|---|
| CN | 1503164 A | 6/2004 |
| CN | 1663249 A | 8/2005 |
| EP | 0 780 777 A1 | 6/1997 |

(Continued)

OTHER PUBLICATIONS

Chinese Office Action issued Aug. 2, 2012, in Patent Application No. 201010526832.9.
Extended European Search Report issued May 18, 2012 in patent application No. 10251899.0.
Combined Chinese Office Action and Search Report issued May 12, 2014 in Patent Application No. 201010526832.9 with English Translation of Category of Cited Documents.

*Primary Examiner* — Jialong He
(74) *Attorney, Agent, or Firm* — Oblon, Spivak, McClelland, Maier & Neustadt, L.L.P.

(57) ABSTRACT

A comment recording apparatus, including a voice input device and a voice output device for recording and playing back comment voice, includes a voice obtaining unit, a voice recognition unit, a morphological analysis unit, and a display generation unit. The voice obtaining unit obtains comment voice as voice data, and registers the obtained voice data to a voice database for each topic specified by a topic specification device and each comment-delivered participant identified from the voice data. The voice recognition unit conducts a voice recognition process on the voice data to obtain text information. The morphological analysis unit conducts a morphological analysis on the text information, and registers a keyword extracted from words obtained by the morphological analysis unit to a keyword database with topic and comment-delivered participant along with voice. The display generation unit displays the keyword in a matrix while relating the keyword to a topic and a comment-delivering participant.

11 Claims, 20 Drawing Sheets

(56) References Cited

U.S. PATENT DOCUMENTS

| | | | |
|---|---|---|---|
| 6,100,882 A * | 8/2000 | Sharman et al. | 704/235 |
| 6,298,129 B1 * | 10/2001 | Culver et al. | 379/202.01 |
| 6,754,631 B1 * | 6/2004 | Din | 704/270 |
| 6,785,429 B1 | 8/2004 | Senoh | |
| 6,850,609 B1 * | 2/2005 | Schrage | 379/202.01 |
| 6,996,526 B2 * | 2/2006 | Basson et al. | 704/231 |
| 7,133,513 B1 * | 11/2006 | Zhang | 379/202.01 |
| 7,248,684 B2 * | 7/2007 | Caspi et al. | 379/202.01 |
| 7,466,334 B1 * | 12/2008 | Baba | 348/14.06 |
| 2003/0187632 A1 * | 10/2003 | Menich | 704/1 |
| 2004/0021765 A1 * | 2/2004 | Kubala et al. | 348/14.08 |
| 2004/0158558 A1 | 8/2004 | Koizumi et al. | |
| 2005/0143994 A1 * | 6/2005 | Mori et al. | 704/235 |
| 2005/0171926 A1 * | 8/2005 | Thione et al. | 707/1 |
| 2005/0209848 A1 | 9/2005 | Ishii | |
| 2006/0074623 A1 * | 4/2006 | Tankhiwale | 704/1 |
| 2007/0106724 A1 * | 5/2007 | Gorti et al. | 709/204 |
| 2007/0185857 A1 * | 8/2007 | Kienzle et al. | 707/5 |
| 2008/0319750 A1 | 12/2008 | Potter et al. | |
| 2009/0099845 A1 * | 4/2009 | George | 704/235 |
| 2009/0271438 A1 * | 10/2009 | Agapi et al. | 707/104.1 |
| 2010/0268534 A1 * | 10/2010 | Kishan Thambiratnam et al. | 704/235 |

FOREIGN PATENT DOCUMENTS

| | | |
|---|---|---|
| JP | 8-317365 | 11/1996 |
| JP | 10-271430 | 10/1998 |
| JP | 3185505 | 5/2001 |
| JP | 2004-23661 | 1/2004 |
| JP | 3526067 | 2/2004 |
| JP | 3736597 | 11/2005 |
| JP | 2006-251898 A | 9/2006 |
| JP | 3879786 | 11/2006 |
| JP | 4215792 | 11/2008 |

* cited by examiner

FIG. 2

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER, PART-TIMER, BUDGET, OVERTIME, TEMPORARY EMPLOYMENT, Mr. AIHARA, DELIVERY, SALES |
| AGENDA 2 | | | |
| AGENDA 3 | | | |
| AGENDA 4 | | | |
| OTHER | | | |

FIG. 3

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK |
| AGENDA 3 | | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

FIG. 4

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | |
| AGENDA 3 | | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

| START TIME | COMMENTED TIME DURATION (milliseconds) | COMMENT-DELIVERED PARTICIPANT | WORD | PART OF SPEECH | STATUS |
|---|---|---|---|---|---|
| ⋮ | ⋮ | ⋮ | ⋮ | ⋮ | ⋮ |
| 15:43:25:01 | 84 | A | DELIVERY | NOUN | AGENDA 1 |
| 15:43:25:85 | 16 | A | BY | PREPOSITION | AGENDA 1 |
| 15:43:26:01 | 75 | A | CONSIDERING | VERB | AGENDA 1 |
| 15:43:26:76 | 20 | A | OF | PREPOSITION | AGENDA 1 |
| 15:43:26:96 | 77 | A | TRUCK | NOUN | AGENDA 1 |
| ⋮ | ⋮ | ⋮ | ⋮ | ⋮ | ⋮ |

FIG. 10

| DISPLAY POSITION (81) | | STATUS (82) | WORD (83) | COMMENT-DELIVERED PARTICIPANT (84) | TIMES OF DELIVERANCE (85) |
|---|---|---|---|---|---|
| ... | | ... | ... | ... | ... |
| AGENDA 1 | | AGENDA 1 | DEVELOPMENT ENVIRONMENT | A | 2 |
| AGENDA 1 | | AGENDA 1 | PERSONNEL | A | 5 |
| AGENDA 1 | | AGENDA 1 | BUDGET | C | 1 |
| OTHER | AGENDA 2 | OTHER | TRUCK | C | 3 |
| OTHER | AGENDA 2 | OTHER | SHIPPING COST | C | 2 |
| OTHER | AGENDA 2 | OTHER | WAREHOUSE | C | 3 |
| OTHER | AGENDA 2 | OTHER | PROFIT | C | 1 |
| AGENDA 2 | | LINK | TRUCK | C | 3 |
| — | | AGENDA DB | DEVELOPMENT ENVIRONMENT | | 3 |
| — | | AGENDA DB | WAREHOUSE | | 2 |
| | | | | | |

FIG. 14

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK |
| AGENDA 3 | | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

FIG. 15

| | A | B | C | |
|---|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER, PART-TIMER, BUDGET, OVERTIME, TEMPORARY EMPLOYMENT, Mr. AIHARA, DELIVERY, SALES | |
| AGENDA 2 ⇦P | | | TRUCK | |
| AGENDA 3 | | | SHIPPING COST, TRUCK, WAREHOUSE, PROFIT | |
| AGENDA 4 | | | | |
| OTHER | | | AGENDA 1, AGENDA 2, SHIPPING COST, TRUCK, WAREHOUSE, PROFIT, AGENDA 3, AGENDA 4 | |

FIG. 17

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK ⇦ P |
| AGENDA 3 | | 93 — THE PRESENT CASE NEEDS MORE TIME FOR TRUCK MAINTENANCE. IN VIEW OF DELIVERY DATE, IT IS BETTER TO ALLOCATE MORE PERSON FOR TRUCKS BECAUSE MR. B IS NOT YET ACCUSTOMED TO THE TRUCK DRIVING. | |
| AGENDA 4 | | | |
| OTHER | | | AGENDA 1, AGENDA 2, SHIPPING COST, TRUCK, WAREHOUSE, PROFIT, AGENDA 3, AGENDA 4 |

FIG. 19

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK |
| AGENDA 3 | 93 — THE PRESENT CASE NEEDS MORE TIME FOR TRUCK MAINTENANCE. IN VIEW OF DELIVERY DATE, IT IS BETTER TO ALLOCATE MORE PERSON FOR TRUCKS BECAUSE MR. B IS NOT YET ACCUSTOMED TO THE TRUCK DRIVING. | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

FIG. 21

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK |
| AGENDA 3 | | | |
| AGENDA 4 | | | |
| OTHER WAREHOUSE | | | AGENDA 1, AGENDA 2, SHIPPING COST, TRUCK, WAREHOUSE, PROFIT, AGENDA 3, AGENDA 4 |

FIG. 22

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, DELIVERY, SALES |
| AGENDA 2 | | | TRUCK |
| AGENDA 3 | | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

DELIVERY

| | A | B | C |
|---|---|---|---|
| AGENDA 1 | DEVELOPMENT ENVIRONMENT, PERSONNEL, BUDGET, RUBY, DEBUG, LEAD TIME | | DELIVERY OF GOODS, CUSTOMER PART-TIMER, BUDGET, OVERTIME, TEMPORARY EMPLOYMENT, Mr. AIHARA, (DELIVERY) SALES |
| AGENDA 2 | | | TRUCK   103 |
| AGENDA 3 | | | |
| AGENDA 4 | | | |
| OTHER | | | AGENDA 1, AGENDA 2, SHIPPING COST, TRUCK, WAREHOUSE, PROFIT, AGENDA 3, AGENDA 4 |

COMMENT RECORDING APPARATUS, METHOD, PROGRAM, AND STORAGE MEDIUM THAT CONDUCT A VOICE RECOGNITION PROCESS ON VOICE DATA

CROSS-REFERENCE TO RELATED APPLICATIONS

This application claims priority to Japanese Patent Application No. 2009-255361, filed on Nov. 6, 2009 in the Japan Patent Office, which is hereby incorporated by reference herein in its entirety.

BACKGROUND OF THE INVENTION

1. Field of the Invention

The present invention relates to a comment recording apparatus that records comments delivered at meetings, visually displaying such comments, and plays back such comments in response to a user request.

2. Description of the Background Art

In meeting information recording/playback apparatuses, a comment structure at the meeting is visually displayed, and such comments can be used as an index to access recorded meeting information. In such known meeting information recording/playback apparatuses, voice and/or visual image recorded at a meeting receives a speaker identifying process to segment recorded voice and/or video information by speaker (i.e., segmentation of information by each speaker), and prepares segmentation results that are visually tied to each speaker or user. As a result, voice and/or video information can be played back by designating a particular segment that includes certain voice and/or video information.

For example, JP-2004-023661-A discloses a system that records image and/or voice of in-progress meeting and uses a key sentence extraction technology for natural language processing, speaker identification process in voice processing, and voice global/regular expression/print (grep) technology to automatically extract comment-related video and/or voice for each speaker for each topic such as agenda. Such system may generate segment information for a same speaker and a same topic from video and/or voice recorded at a meeting using key words and comments of each speaker extracted from minutes of the meeting to enhance re-use of recorded information.

However, such meeting information recording and playback apparatus of JP-2004-023661-A uses an algorithm that refers to other comment-delivering participants who have delivered comments before and after the relevant comment-delivering participant. In such a condition, it becomes difficult to search a particular topic and/or content in more detail because a user needs to remember the context in which one or more relevant comments were delivered. Further, because the minutes of meeting are used, such system cannot be used for an in-progress meeting because minutes of meeting is not yet been prepared.

SUMMARY

In one aspect of the present invention, a comment recording apparatus including a voice input device and a voice output device for recording and playing back comment voice is devised. The comment recording apparatus includes a voice obtaining unit, a voice recognition unit, a morphological analysis unit, and a display generation unit. The voice obtaining unit obtains comment voice, delivered by participant, as voice data using the voice input device, and registers the obtained voice data to a voice database for each topic specified by a topic specification device from among a plurality of topics registered in a topic database in advance, and each comment-delivered participant identified from the voice data. The voice recognition unit conducts a voice recognition process on the voice data registered in the voice database to obtain text information. The morphological analysis unit conducts a morphological analysis on the text information obtained by the voice recognition unit, and registers a keyword extracted from words obtained by the morphological analysis unit to a keyword database with topic and comment-delivered participant registered to the voice database along with voice. The display generation unit displays the keyword in a matrix while relating the keyword to a topic and a comment-delivering participant.

In another aspect of the present invention, a comment recording method using a comment recording apparatus for recording comment voice and playing back recorded comment voice is devised. The comment recording apparatus including a voice input device, a voice output device, and a display generation unit. The method includes the steps of registering voice data, obtained by a voice obtaining unit from as comment voice, delivered by participant, using the voice input device, in a voice database for each topic specified by a topic specification device from the voice data from among a plurality of topics registered in a topic database in advance, and each comment-delivering participant identified; obtaining text information by conducting a voice recognition process on the voice data registered in the voice database by using the voice recognition unit; conducting a morphological analysis on the text information and extracting a keyword from words obtained by the morphological analysis; registering a keyword in a keyword database by topic and comment-delivering participant registered to the voice database along with voice; and displaying the keyword in a matrix by using the display generation unit while relating the keyword with a topic and a comment-delivering participant.

In another aspect of the present invention, a computer-readable medium storing a program for recording comment voice using a comment recording apparatus for recording comment voice, and playing back the recorded comment voice is devised. The comment recording apparatus including a voice input device, and a voice output device, and a display generation unit. The program includes instructions that when executed by a computer causing the computer to execute a method of recording and playing back comment voice using the comment recording apparatus. The method includes the steps of registering voice data, obtained by a voice obtaining unit from as comment voice, delivered by participant, using the voice input device, in a voice database for each topic specified by a topic specification device from the voice data from among a plurality of topics registered in a topic database in advance, and each comment-delivering participant identified from the voice data; obtaining text information by conducting a voice recognition process on the voice data registered in the voice database by using the voice recognition unit; conducting a morphological analysis on the text information and extracting a keyword from words obtained by the morphological analysis; registering a keyword in a keyword database by topic and comment-delivering participant registered to the voice database along with voice; and displaying the keyword in a matrix by using the display generation unit while relating the keyword with a topic and a comment-delivering participant.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 shows an example standard interface for a comment recording apparatus according to an example embodiment;

FIG. 3 shows an example interface condition when a topic is changed from one to another explicitly;

FIG. 4 shows an example interface condition of a comment recording system when a topic is changed from an agenda to other topic when one comment is in recording;

FIG. 10 shows an example table of a keyword DB to register content;

FIG. 14 shows a process of moving a word in a tag cloud displayed in other section to one agenda section explicitly;

FIG. 15 shows an example condition that related commented-keyword is emerged;

FIG. 17 shows an example condition when comment is displayed for recalling;

FIG. 19 shows an example condition when recorded comment is played back;

FIG. 21 shows an example condition when a new agenda is to be made;

FIG. 22 shows an importance/relatedness slider; and

Figure 1A:
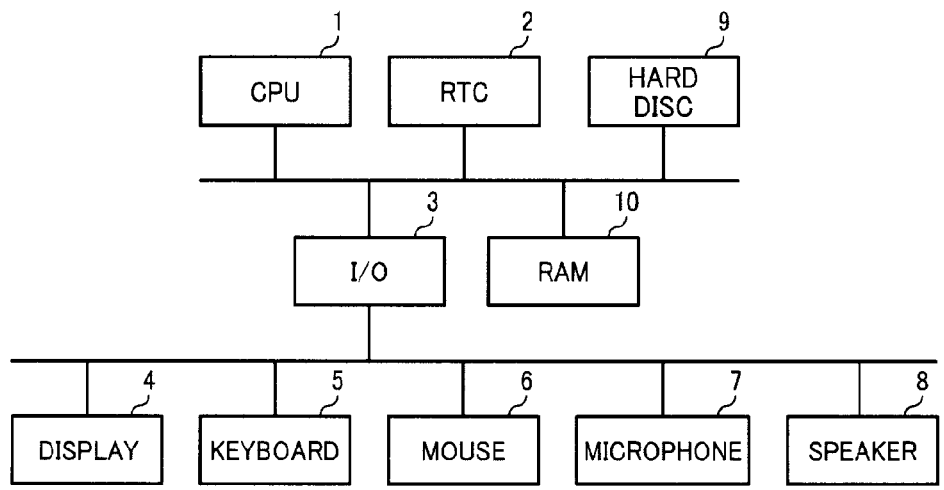
FIG. 1A and FIG. 1B show a schematic configuration of comment recording system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, a comment recording apparatus according to example embodiment is described hereinafter.

Figure 1B:
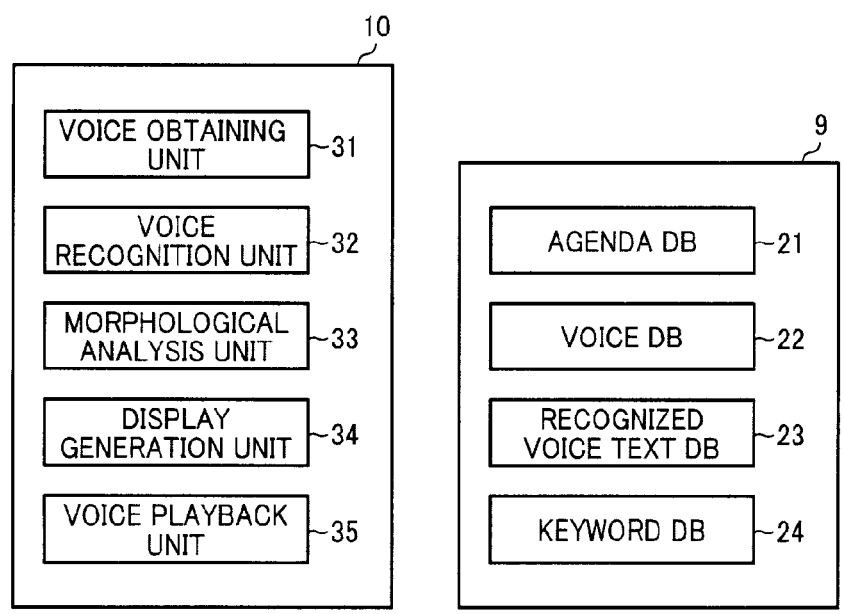

FIG. 1 shows an example configuration of a comment recording apparatus or system according to an example embodiment. FIG. 1A shows a comment recording apparatus according to an example embodiment. As shown in FIG. 1A, the comment recording apparatus may include a central processing unit (CPU) 1, a real time clock (RTC) 2, a hard disk 9, and a random access memory (RAM) 10, for example. The CPU 1 controls the apparatus or system as a whole, and further, executes various programs. As such, the CPU 1 may be used as a controller or control unit. The RTC 2 measures a real time when an event such as for example generation of voice occurs, wherein participants deliver comment as voice. The RTC 2 may be used as a real time measuring device. The hard disk 9 may be used as a storage to store various programs and database. The RAM 10 may be used to load programs, stored in the hard disk 9, so that the CPU1 executes such programs. Further, the comment recording apparatus may include a man-to-machine interface such as a display 4, a keyboard 5, a mouse 6, a microphone 7, and a speaker 8 via an input/output (I/O) 3. The display 4 is used as a display device or display unit, and the keyboard 5 and mouse 6 is used as an input device or input unit. The microphone 7 is used as a voice input device to record voice of comment-delivering participant, who speaks or talks something in-progress meeting, and the speaker 8 is used as a voice output device to playback recorded voice. The microphone 7 may also pick up audio or sound other than human voice delivered in meetings, which may be regarded as noise information, and sound regarded as noise information may be deleted from voice data by conducting given processes. Voice may be human voice but other audio or sound information, which may be required for meetings, can be recorded and used as information equivalent to human voice, as required. FIG. 1B shows an example configuration of the comment recording apparatus or system according to an example embodiment, which is implemented by using software. As shown in FIG. 1B, the hard disk 9, provided for the comment recording apparatus, may configure an agenda database (DB) 21, a voice database (DB) 22, a recognized voice text database (DB) 23, and a keyword database (DB) 24, therein, for example.

The agenda DB 21 registers agenda (or topic) of meeting with attaching agenda identification (ID) and detail information of content of each agenda, recorded together. Hereinafter, agenda identification may be referred to as "agenda ID." The voice DB 22 registers voice obtained by using the microphone 7. The recognized voice text DB 23 registers words included in voice text, which are recognized from voice registered in the voice DB 22. The keyword DB 24 registers, for example, words of noun, extracted from voice text registered in the recognized voice text DB 23, and agenda and detail information registered in the agenda DB 21. The agenda DB 21 may be used as a topic database.

Further, the RAM 10, provided for the comment recording apparatus, may configure a voice obtaining unit 31, a voice recognition unit 32, and a morphological analysis unit 33 therein, for example.

The voice obtaining unit 31 obtains voice in comment from an in-progress meeting by using the microphone 7, divides voice data for each comment-delivered participant and each agenda, and registers voice with a real time that comment was delivered to the voice DB 22, in which real time can be detected by the RTC 2. The voice recognition unit 32 obtains voice text by conducting a voice recognition process to voice data registered in the voice DB 22. After conducting a morphological analysis process to the obtained voice text to obtain words, the morphological analysis unit 33 registers the obtained words to the recognized voice text DB 23 while registering words of "noun" extracted from registered words to the keyword DB 24. Further, the morphological analysis unit 33 extracts keyword (such as noun) for each agenda from agenda and detail information registered in the agenda DB 21, and registers extracted noun as keyword in the keyword DB 24.

Further, the RAM 10 may configure a display generation unit 34, and a voice playback unit 35. The display generation unit 34 displays an interface screen on the display 4, and changes displaying content based on execution result of each program and information stored in each database. The voice playback unit 35 plays back voice data stored in the voice DB 22, and conducts a process of outputting voice from the speaker 8. Program used for conducting the above described processes can be stored in a storage medium such as compact disc read-only memory (CD-ROM), memory card, or the like, and a general purpose computer provided with a microphone and a speaker can execute such program, by which the comment recording apparatus according to an example embodiment can be devised.

FIG. 2 shows an example standard interface for the comment recording apparatus according to an example embodiment, but not limited such interface. An interface shown in FIG. 2 may be displayed as an interface screen on the display 4 by the display generation unit 34, and such interface may be generated as a matrix 40 configured with agenda input to the agenda DB 21 in advance, and comment-delivering participant. The matrix 40 is a matrix having agenda ID column 41 and keyword columns 42. In the matrix 40 of FIG. 2, the agenda ID column 41 may include a plurality of rows such as agenda ID row 41-1, 41-2, and so on. Each cell of each agenda ID row 41 (such as 41-1, 41-2) is used to display each agenda of meeting, and each keyword column 42 is used to display keyword registered in the keyword DB 24 for each cell set for each comment-delivering participant for each meeting.

Specifically, comment of participants obtained by the microphone 7 is divided by the voice obtaining unit 31 for each comment of one comment-delivered participant, in which a conventionally known voice processing method can be applied for identifying comment-delivered participant. Then, a keyword is extracted by conducting given processing by the voice recognition unit 32 and the morphological analysis unit 33, and the extracted keyword is displayed in one cell of the keyword columns 42 of the matrix 40, set for concerned comment-delivering participant as tag cloud 43 as shown in FIG. 2. In an example case shown in FIG. 2, a cell of agenda ID row 41-1 corresponds to agenda 1 having "ID 1," and keywords such as "delivery of goods, customer, part-timer or the like" are displayed as the tag cloud 43 in a cell corresponding to a participant C.

Further, to register voice of comment-delivered participant for each agenda in the voice DB 22 by the voice obtaining unit 31, it is required to instruct the comment recording apparatus which agenda is a current topic. Accordingly, in the comment recording apparatus according to an example embodiment, the mouse 6 may be used as a topic-instructing pointer, in which a mouse pointer P (see FIG. 2) may be operated to instruct the comment recording apparatus which agenda is a current topic for a meeting.

FIG. 3 shows an example of interface of the comment recording apparatus when a topic is changed from one agenda to another agenda. For example, when a current topic is changed from one agenda having ID1 to another agenda having ID2, the mouse pointer P is moved to a cell corresponding to another agenda (i.e., agenda ID row 41-2 having ID2) of the matrix 40. When an agenda is changed or shifted as such, generation of tag cloud is started at a cell corresponding to an agenda which is designated by such agenda change. Further, the input by a keyboard or the like can be used to change or shift an agenda.

Specifically, based on a current position of the mouse pointer P on a cell of the agenda ID row 41 in the matrix 40, the voice obtaining unit 31 changes an agenda ID to be written to the voice DB 22 with voice data. For example, when the mouse pointer P is placed at a cell of the agenda ID row 41-2 corresponding to the agenda having ID2, the voice obtaining unit 31 registers comment, which was delivered when the agenda having ID2 was discussed to the voice DB 22, which means the voice obtaining unit 31 registers comment delivered for the agenda having ID2 to the voice DB 22. Similar process can be applied for the agenda ID rows 41-3 and 41-4. Further, in some cases, when one agenda is discussed as a current topic, topic may shift from one agenda to other one not related to agenda. Even in such a case, such change can be instructed to the comment recording apparatus.

FIG. 4 shows an example case when comment is delivered and recorded for one agenda, and during such condition, a current topic is changed from agenda to other one, and such change is explicitly instructed to the comment recording apparatus. As shown in FIG. 4, when comment is delivered for the other one, which is other than agenda discussed as a current topic, the mouse pointer P is placed on a cell of the agenda ID row 41-5 corresponding to "other" in the matrix 40, and comment is started to be recorded to the voice DB 22 with ID of "other." After conducting given processing by morphological analysis unit 33 and the display generation unit 34, comment delivered at such timing corresponding to "other" is displayed as a tag cloud in a cell set for a cell of the agenda ID row 41-5 for "other" corresponding to a comment-delivering participant (e.g., a tag cloud is set for participant C if participant C delivered such comment), and the comment is displayed in a cell 90 as shown in FIG. 4.

A description is now given to information, data, or content to be registered to each database, operations of each processing unit using certain programs to register information, data, or content to each database, and a process of displaying keyword in the matrix 40.

Figure 5:
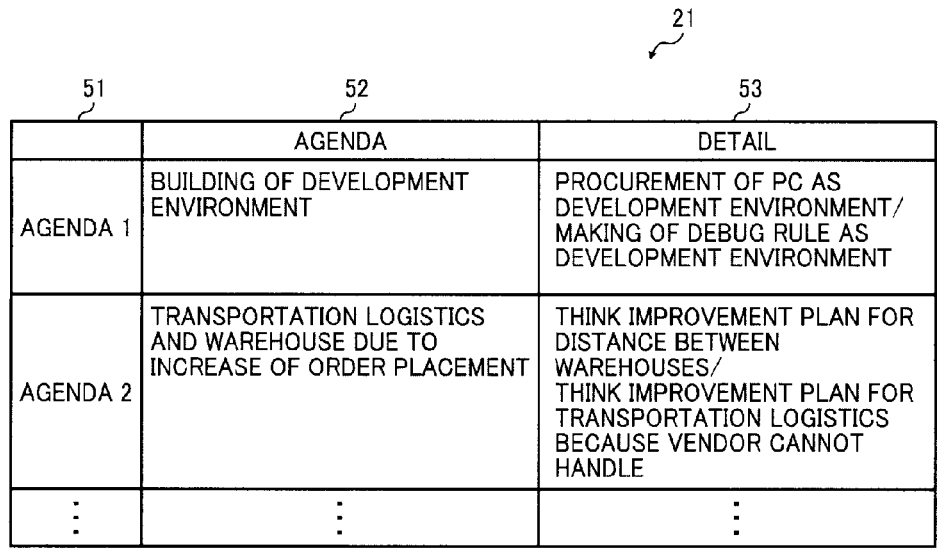
FIG. 5 shows an example table of an agenda DB to register content of agenda.

FIG. 5 shows an example table of agenda DB 21 to register information on agenda. As shown in FIG. 5, each agenda having a given ID is input in each cell of ID column 51, a title of each agenda is input in each cell of agenda column 52, and detailed content of each agenda is input in each cell of detail column 53, in which detailed content may be an explanation sentence, for example. As such, the agenda DB 21 may store information set for each agenda, and such agenda DB 21 may be referred to as a topic database storing information set for each topic (e.g., agenda).

Figure 6:
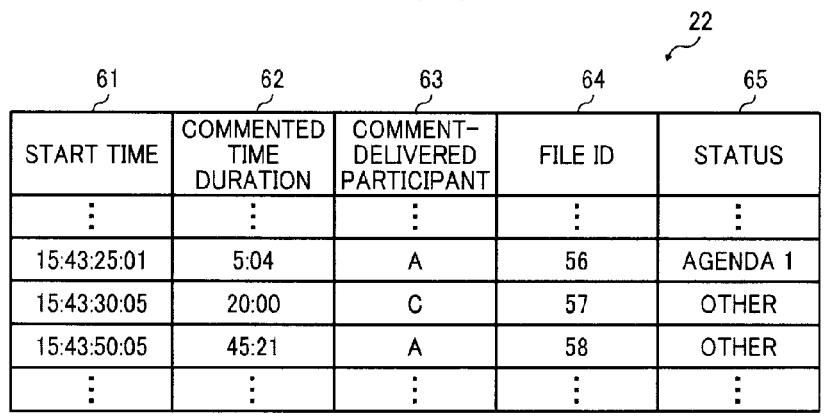
FIG. 6 shows an example table of a voice DB to be register content.

FIG. 6 shows an example table of voice DB 22 to register content. Voice data obtained by the voice obtaining unit 31 is divided for each comment and each comment-delivered participant, and then the divided voice data is registered to the voice DB 22. Specifically, column 61 stores start time of each comment, column 62 stores a commented time duration of each comment (such as a time duration until a next comment was delivered), column 63 stores name or the like of comment-delivered participant, column 64 stores file ID identifying each divided file, and column 65 stores status information of comment, which indicates an agenda ID number when comment was delivered. Such information may be determined based on positions of the mouse pointer P in the matrix 40, which is described with reference to FIGS. 3 and 4. For example, as shown in FIG. 6, a participant A delivered a comment for agenda having ID1 from the time of 15:43:25:01 for 5 seconds and 04 milliseconds, and the comment is stored in a file having ID 56.

Figures 7, 8:
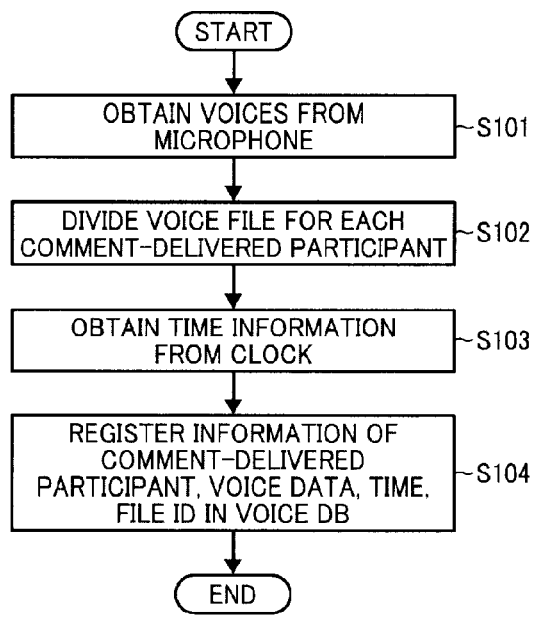
FIG. 7 shows a flowchart explaining a process of registering voice to a voice DB by using a voice obtaining unit.
FIG. 8 shows an example table of a recognized voice text DB to register content.

FIG. 7 shows a flowchart explaining a process of registering voice-related information to the voice DB 22 by using the voice obtaining unit 31. As shown in FIG. 7, at first, voice is obtained from an in-progress meeting using the microphone 7 (step S101), and the voice obtaining unit 31 divides a voice file for each comment-delivering participant (step S102). Then, the commented time information is obtained by using the RTC 2 (step S103), and information of participant that delivered comment, voice data, commented time duration information, and file ID are registered in the voice DB 22 (step S104).

FIG. 8 shows an example table of the recognized voice text DB 23 to register content. The morphological analysis unit 33 conducts a morphological analysis for each comment for each comment-delivered participant registered in the voice DB 22 to extract words. Then, for such extracted words, the recognized voice text DB 23 registers extracted words with a delivering start time of word, a commented time duration that words were delivered, a name or the like of participant that delivered words, a part of speech for each word such as noun, verb, preposition, or the like and agenda ID of agenda discussed as a topic when extracted words were delivered.

Specifically, as shown in FIG. 8, column 71 registers a start time that a word was started to deliver; column 72 registers a commented time duration with a time unit of milliseconds, which means time duration of one comment such as one word; column 73 registers a name or the like of comment-delivered participant; column 74 registers word; column 75 registers a part of speech of word; column 76 registers status information of word, in which an agenda, discussed as a topic when concerned word was delivered, is registered as status. For example, in FIG. 8, a participant A delivered a word of "delivery" (which is noun) from the time 15:43:25:01 for 84 milliseconds in relation to agenda having ID1, and information of delivered word is registered in the recognized voice text DB 23.

Figure 9:
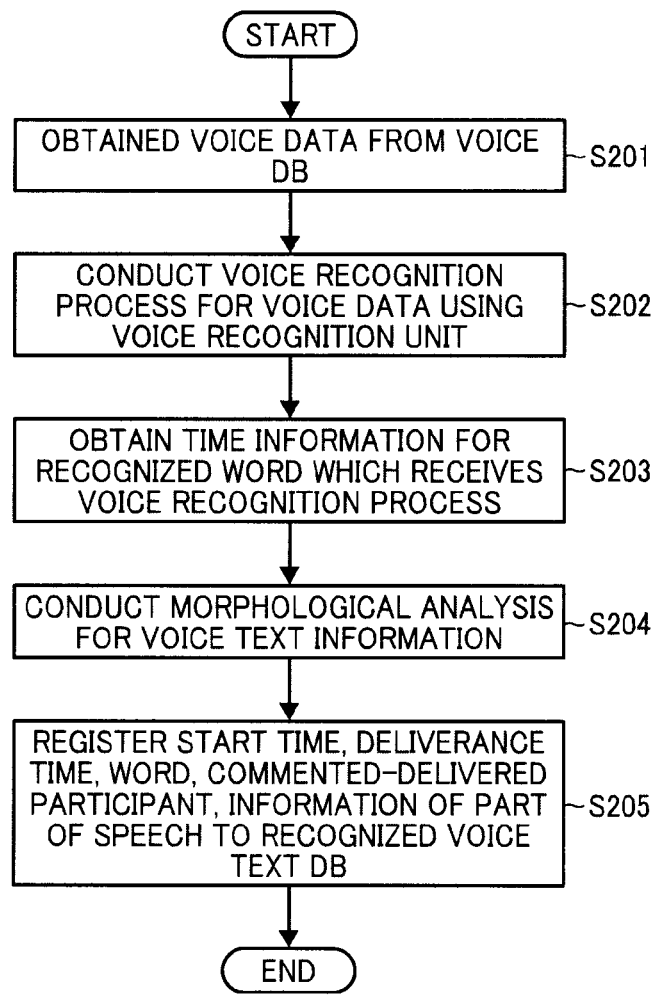
FIG. 9 shows a flowchart explaining a process of registering word in comment to a recognized voice text DB by using a morphological analysis unit.

FIG. 9 shows a flowchart explaining a process of registering word delivered in comment to the recognized voice text DB 23 by using the morphological analysis unit 33. At first, voice data registered in the voice DB 22 is obtained (step S201), and then the voice recognition unit 32 conducts a voice recognition process for the voice data to obtain voice text (step S202). Further, the voice recognition unit 32 obtains time information corresponding to a recognized word, which receives the voice recognition process (step S203). Specifically, a delivered timing of each sound, included in voice data, during a comment delivering period can be obtained.

Then, the morphological analysis unit 33 conducts a morphological analysis for the obtained voice text information to divide voice text information into words, and determines a part of speech of each word (step S204). Then, based on the time information obtained at step S203, the morphological analysis unit 33 registers a start time of each word, delivered time, word, name or the like of comment-delivered participant, information of part of speech to the recognized voice text DB 23 (step S205).

FIG. 10 shows an example table of keyword DB 24 to register content. Among words registered in the recognized voice text DB 23, nouns may be registered in the keyword DB 24, for example, but it should be noted that other parts of speech can be registered as required. Specifically, an agenda when a word was delivered, an agenda ID to display a word in the matrix 40 (FIG. 2), a name or the like of comment-delivered participant, and the number of delivered times of concerned word are registered to the keyword DB 24 with concerned word.

Specifically, as shown in FIG. 10, column 81 stores display position that a word is to be displayed in the matrix 40 (i.e, a row of each agenda in FIG. 2); column 82 stores status information of word, which indicates an agenda ID when the word was delivered; column 83 stores each word; column 84 stores a name of the like of participant who delivered word; column 85 stores the number of times that a word was delivered for each agenda, that is the number of times of word that emerged at a display position in the matrix 40. In FIG. 10, for example, a participant A delivered a word of "development environment" for two (2) times when the agenda having ID1 was a topic for discussion, and the word of "development environment" is registered in the keyword DB 24 with an instruction that such word is to be displayed in the tag cloud 43 in a cell of the keyword column 42 in the matrix 40 (FIG. 2), corresponding to a column for the participant A and a row of agenda having ID1. A detail of cell 87 will be explained later with FIG. 11.

Further, in FIG. 10, each word (such as noun), obtained by conducting a morphological analysis to text registered in the section of agenda and detail in the agenda DB 21 by the morphological analysis unit 33, is registered in row 86, with corresponding agenda ID indicated in the column 51, and the number of times that a concerned word emerged in the column 85.

Figure 11:
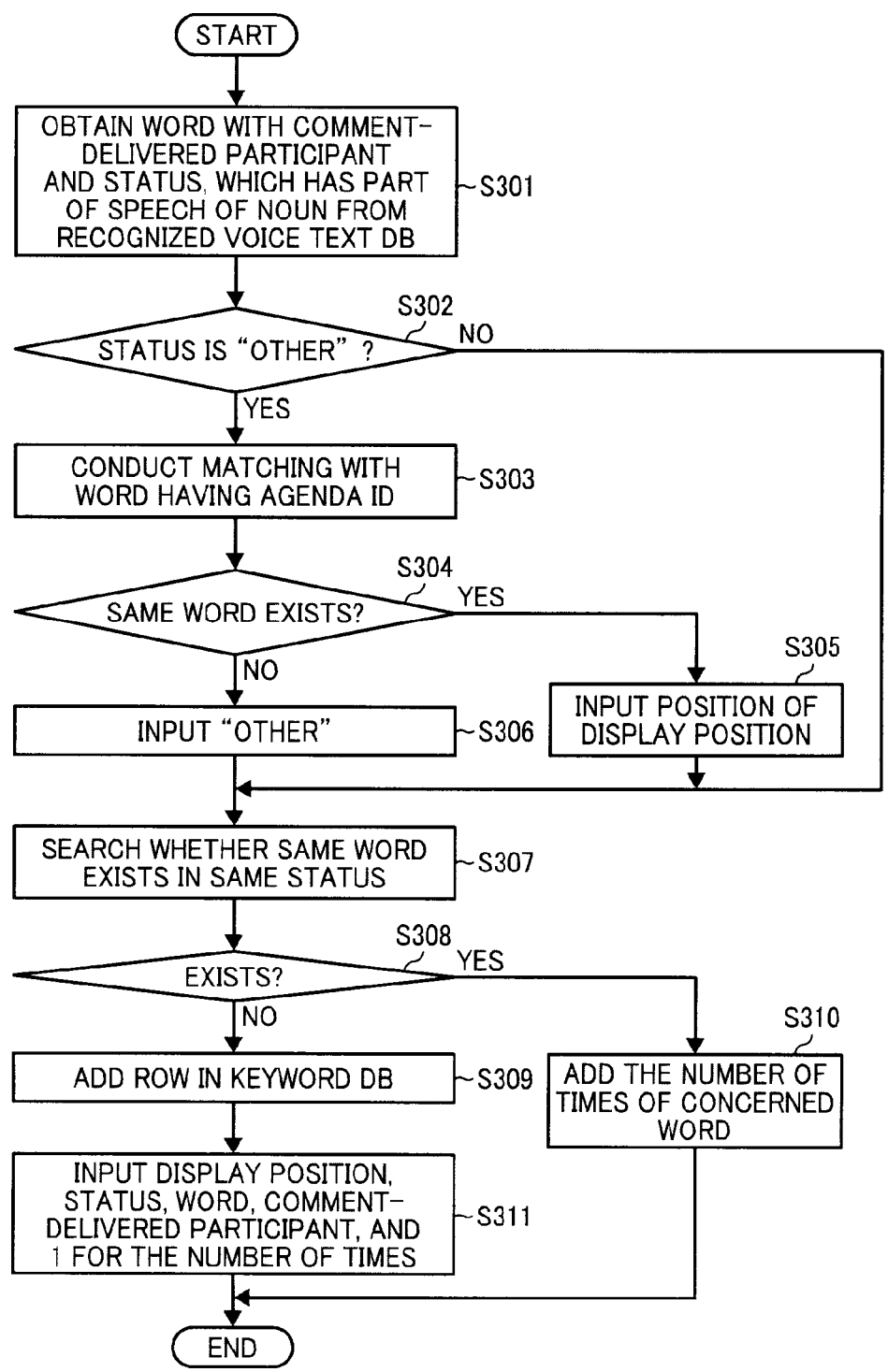
FIG. 11 shows a flowchart explaining a process of registering word in a recognized voice text DB to a keyword DB by using a morphological analysis unit.

FIG. 11 shows a flowchart explaining a process of registering words in the recognized voice text DB 23 to the keyword DB 24 by using the morphological analysis unit 33. The morphological analysis unit 33 obtains word having a part of speech of "noun" from the recognized voice text DB 23 with information of comment-delivered participant and status such as agenda (step S301).

As explained with reference to FIG. 4, when a comment, not related to an agenda discussed as a current topic, is delivered, a recording of voice of such comment can be instructed to the comment recording apparatus using ID of "other" as status. If the recorded status is other (step S302: YES), a matching process is conducted with words, registered in the recognized voice text DB 23, having a status of any one of agenda ID (i.e., ID other than ID of other) (step S303). If a same word is found in one agenda ID, or exists (step S304: YES), an agenda ID of such word and ID of other are both input to a given cell (see cell 87 in FIG. 10) of the column 81 (step S305). If a same word is not found in any agenda ID (step S304: NO), the ID of other is input to a given cell in the column 81 (step S306).

Then, it is searched whether a same word exists in a same status (or same agenda) in the keyword DB 24 (step S307). If a same word does not exist in the same agenda (step S308: NO), a new row is added to the keyword DB 24 (step S309), and a display position, status, word, comment-delivered participant, the number of delivered times of word (e.g., one time) are input (step S311). If a same word exists in same agenda (step S308: YES), one (1) is added to a value in a cell of column 85 corresponding to a same word (step S310). If step S302 is No, that is if the status is determined as any one of agenda ID, the process goes to step S307.

Figure 12:
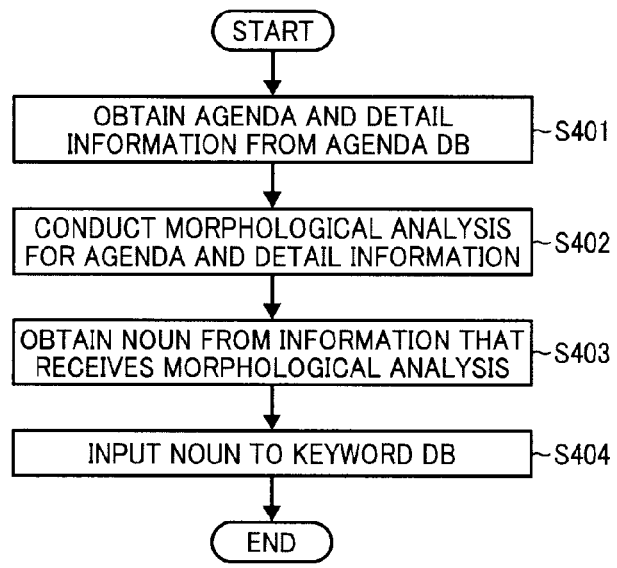
FIG. 12 shows a flowchart explaining a process of registering word in an agenda DB to the keyword DB by using a morphological analysis unit.

FIG. 12 shows a flowchart explaining a process of registering words in the agenda DB 21 to the keyword DB 24 by using a morphological analysis unit 33. The morphological analysis unit 33 obtains agenda and detail information from the agenda DB 21 (step S401). Then, a morphological analysis is conducted for the obtained agenda and detail information (step S402). Based on the morphological analysis result, nouns alone may be obtained from words (step S403). It should be noted that other parts of speech such as verb can be obtained as required. Then, each noun is input to the keyword DB 24 with a corresponding agenda ID for each agenda (step S404).

Figure 13:
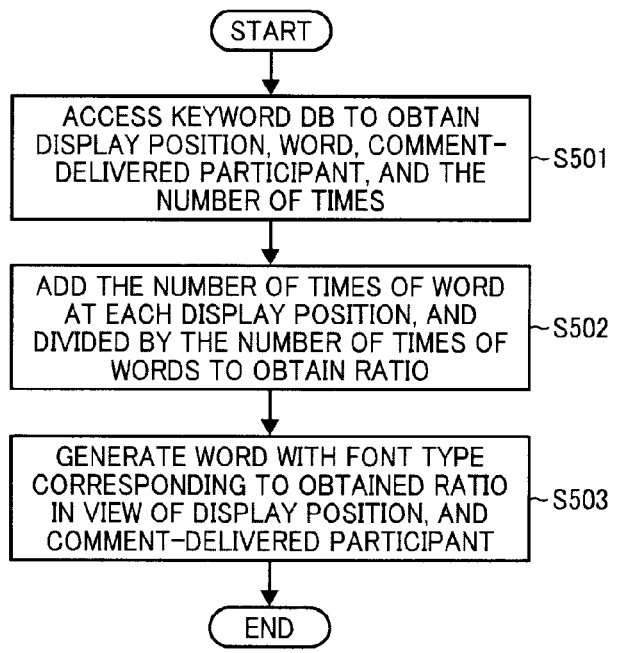
FIG. 13 shows a flowchart explaining a process of displaying a tag cloud in a matrix by using a display generation unit.

FIG. 13 shows a flowchart explaining a process of displaying a tag cloud in a matrix by using the display generation unit 34. The display generation unit 34 accesses the keyword DB 24 to obtain display position (see column 81 in FIG. 10), word (see column 83 in FIG. 10), comment-delivered participant (see column 84 in FIG. 10), and the number of delivery times of word (see column 85 in FIG. 10) (step S501). Then, the number of emerged times of all words at each display position are added, and the number of emerged times of each word is divided by the number of emerged times of all words to obtain a ratio of emergence or appearance of each word (step S502). Then, each word is generated with a font type (such as size) corresponding to the ratio of emergence obtained at step S502 in view of display position, and comment-delivered participant (step S503). With the above-described processes, the comment recording apparatus according to an example embodiment can extract and display keywords from comments delivered by participants.

FIG. 14 shows a process of moving a word in a tag cloud displayed in a row of other to a row of agenda. In FIG. 14, if a word 100 in a tag cloud displayed in cell 90, corresponding to the row of other, is assumed to be corresponding to the agenda having ID2, the mouse pointer P is operated to drag the word 100 from cell 90 to cell 91 corresponding to the agenda having ID2 and the same comment-delivered participant, by which the word 100 can be included in a tag cloud in cell 91. When such movement of word is conducted, the content in the column 81 (i.e., display position information) of keyword DB 24 is also changed.

Further, in the comment recording apparatus, when a topic is changed to another agenda as shown in FIG. 3, a keyword displayed in a row of other, which may be related to such changed another agenda, can be displayed as a tag cloud. FIG. 15 shows a condition when related commented keywords are emerged. For example, when a topic is changed to an agenda having ID2, words such as "shipping cost, truck, warehouse, profit" in the cell 90 having ID of "other" and related to the agenda having ID2 can be displayed as a tag cloud 92. With such a process, a user can recall what kind of comment was delivered as word-to-word basis.

Figure 16:
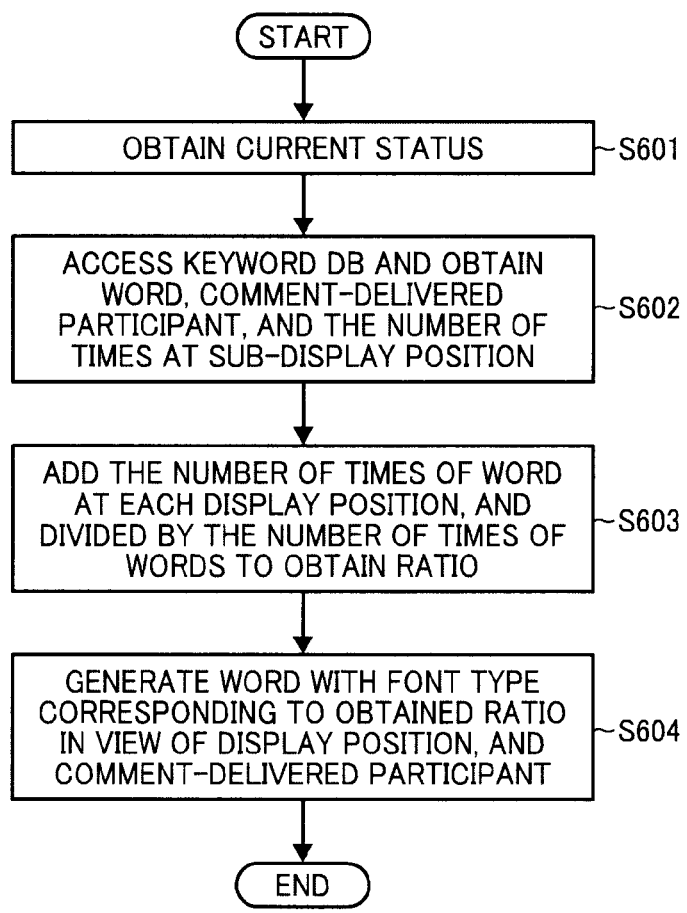
FIG. 16 shows a flowchart explaining a process of display processing for related keyword by using a display generation unit.

FIG. 16 shows a flowchart explaining a process of display processing for related keyword by using the display generation unit 34. When a topic is changed or shifted from one agenda to another agenda, the display generation unit 34 obtains current status (or agenda), which is a change-destination agenda (step S601). Then, the display generation unit 34 accesses the keyword DB 24 to obtain word, comment-delivered participant, and the number of emerging times of word in a sub-display position (cell 87) corresponding to display position for "other" (step S602).

Then, the number of emerged times of obtained words are added, and the number of emerged times of each word is divided by the number of emerged times of obtained words to obtain a ratio of emergence of each word (step S603). Then, each word is generated with a given size font type corresponding to the obtained ratio of emergence and in view of display position and comment-delivered participant, and is displayed (step S604).

FIG. 17 shows an example condition when comment is displayed for recalling. When the mouse pointer P (or mouse cursor) is placed near a word in a tag cloud displayed in a cell of the matrix 40, the display generation unit 34 displays the word selected by the mouse pointer P and other words existing before and/or after the selected word as a sentence 93 (see FIG. 17) based on text information registered in the recognized voice text DB 23. For example, the sentence 93 may include fifty (50) letters, but the numbers of letters is not limited thereto. When a sentence is displayed as such, a selected word and other words existing before the selected word may be displayed as a sentence, a selected word and other words existing after the selected word may be displayed as a sentence, or a selected word and other words existing before and after the selected word may be displayed as a sentence. With such a process, a user can recall what comment is delivered easily. Same effect can be obtained by clicking a word in a tag cloud displayed with a given highlighted manner shown in FIG. 2.

Figure 18:
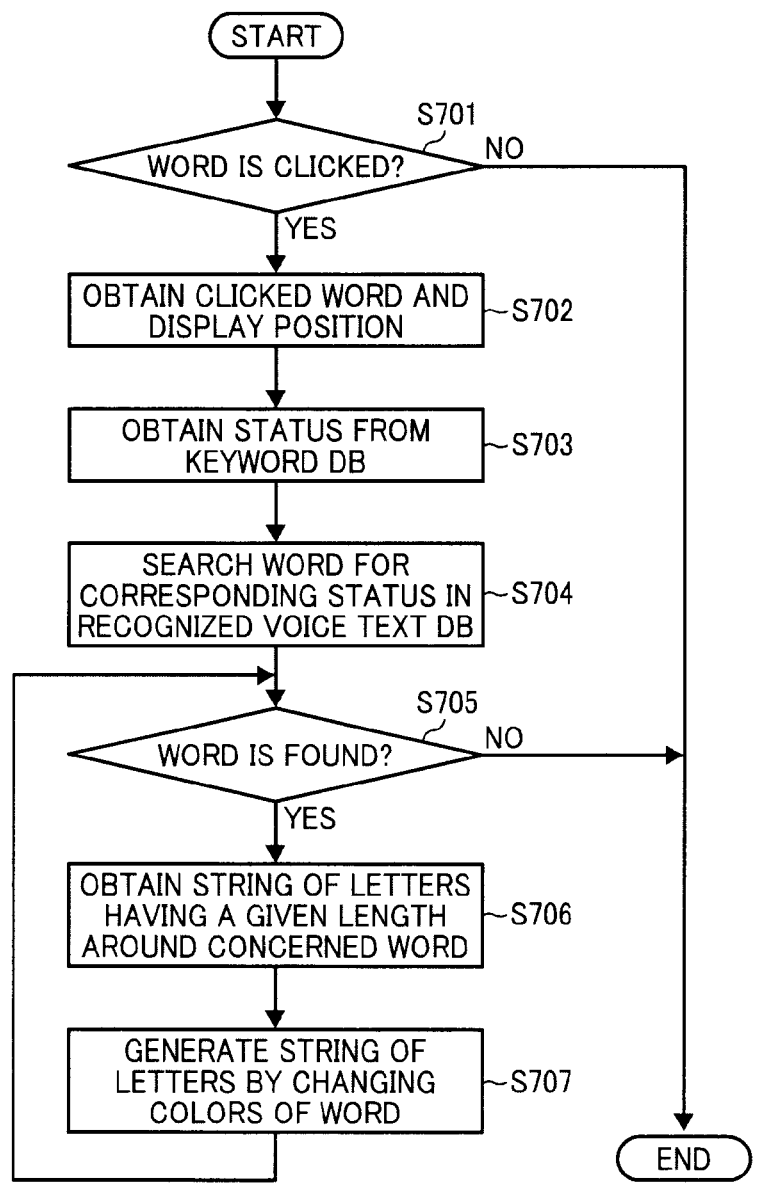
FIG. 18 shows a flowchart explaining a process of recalling and display processing by using a display generation unit.

FIG. 18 shows a flowchart explaining a recalling process using a display generated by the display generation unit 34. As shown in FIG. 18, if a word in a tag cloud is clicked (step S701: YES), the clicked word and display position are obtained (step S702). Then, status (or agenda) is obtained from the keyword DB 24 (step S703), and the recognized voice text DB 23 is searched for a concerned word of concerned status (step S704).

If the word is found (step S705: YES), a string of letters having a given length around the found word (for example, 50 letters) is obtained (step S706), and such string of letters is generated (step S707). Further, a color of concerned word in the string of letters can be changed, or a font type of concerned word can be set to bold to emphasize or highlight the concerned word. Then, the process returns to step S705, and the process continues until a to-be-checked word does not exist anymore, for example. FIG. 19 shows a condition when a recorded comment is played back. When the sentence 93 shown in FIG. 17 is selected by clicking operation of the mouse pointer P, voice can be played back for such sentence 93 shown in FIG. 19. With such a process, content of delivered comment can be recalled completely.

Figure 20:
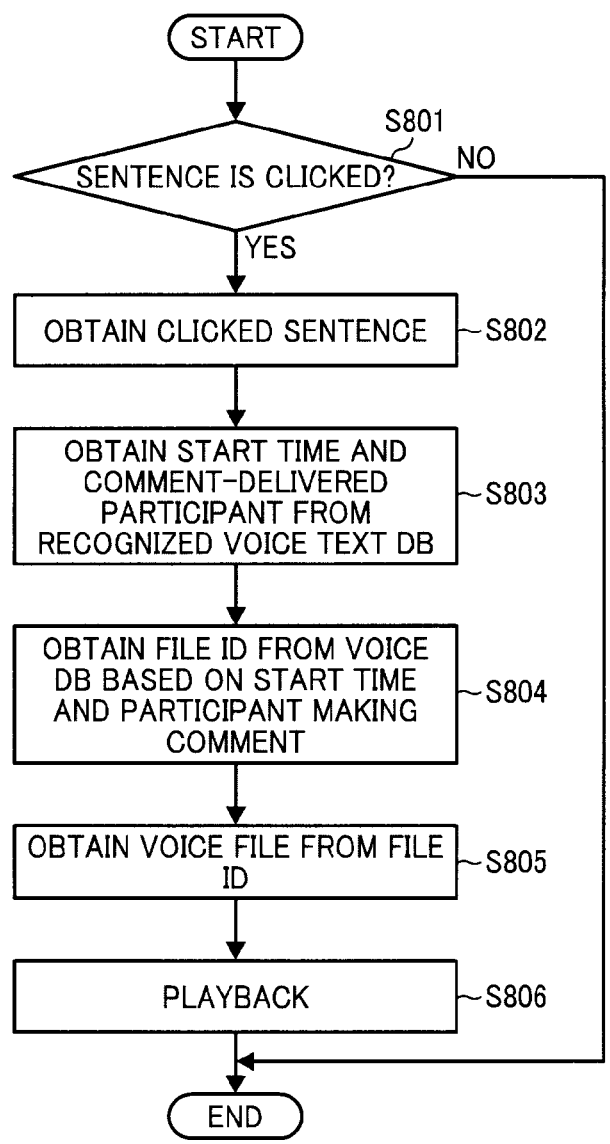
FIG. 20 shows a flowchart explaining a process of playback of comment by using a voice playback unit.

FIG. 20 shows a flowchart explaining a process of playback of comment by using the voice playback unit 35. When a clicking of the sentence 93 in the matrix 40 is detected by the I/O 3 (step S801), the voice playback unit 35 obtains the clicked sentence (step S802). Then, the voice playback unit 35 accesses the recognized voice text DB 23 to obtain a start time and comment-delivered participant (step S803). Further, the voice playback unit 35 obtains a file ID from the voice DB 22 based on the start time and comment-delivered participant (step S804). Then, the voice playback unit 35 obtains a voice file based on the file ID (step S805), and plays back voice (step S806).

FIG. 21 shows an example condition when a new agenda is to be set. When a new agenda is to be generated from a word in a tag cloud, a word 101 used for setting new agenda is dragged by a mouse or the like (used as a pointer) to one cell of agenda row 41, to generate a new agenda in the agenda DB 21, and a display of the matrix 40 (FIG. 2) is changed.

FIG. 22 shows an example of importance/relatedness slider. A facilitator can facilitate a level of importance and relatedness of delivered content by setting a level. A level-inputting user interface (UI) 102, disposed under agenda, can be used for inputting relatedness, or a wheel mouse can be used for inputting relatedness. As such, the level-inputting UI 102 can be used as an input unit to inputting relatedness and/or importance of content, and such level-inputting UI 102 may be referred to as importance/relatedness slider, for example.

Figure 23:
FIG. 23 shows an example condition when a mistakenly recognized tag is deleted.

FIG. 23 shows a deletion of mistakenly recognized tag. When a word is mistakenly recognized, a wrong word is displayed as a word 103. In such case, the word 103 can be dragged to a trash box TB displayed on the display 4, by which a mistakenly recognized tag can be deleted. Further, based on a given setting, voice recognition for such mistakenly recognized tag can be re-conducted using recorded voice data.

In the above-described example embodiment, noun is used as keyword, however other part of speech such verb, preposition, or the like can be used keyword as required, and the above-described example embodiment can be applied to any language or the like.

In the above-described example embodiment, computer-readable program can be stored in a recording medium such as hard disc, ROM, or the like. Further, computer-readable program can be stored in a removable recording medium such as magnetic disc (e.g., flexible disc), optical disc (e.g., compact disc, digital versatile disc), and magneto-optical disc (MO) temporarily or permanently. Such removable recording medium may be available as package software. Further, computer-readable program can be installed to a computer from such removable recording medium, or can be downloaded from a download site via a network. For example, program can be transmitted to a computer from a download site using wired or wireless communication via a network such as local area network (LAN), the Internet, or the like, and such downloaded program can be installed in a recording medium such as hard disc in the computer. As such, in the above-described example embodiment, a computer can be used with a computer-readable program to control functional units, devices, or the like used for conducting the above-described processes. For example, a particular computer (e.g., personal computer, work station) may control the system or apparatus using a computer-readable program, which can execute the above-described processes or steps. Further, in the above-described exemplary embodiment, a storage device (or recording medium), which can store computer-readable program, may be a flexible disc, a compact disc read only memory (CD-ROM), a digital versatile disc read only memory (DVD-ROM), DVD recording only/rewritable (DVD-R/RW), a memory card, a memory chip, a mini disc (MD), a magneto-optical disc (MO), magnetic tape, hard disc in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the image forming system or apparatus according to example embodiment, for example.

With the above-described configuration according to an example embodiment, delivered and recorded comment in an in-progress meeting can be easily displayed for each comment-delivered participant in view of progress of each agenda, and comment can be recalled easily by using playback operation.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A comment recording apparatus including a voice input device and a voice output device for recording and playing back comment voice, the comment recording apparatus comprising:
    a voice obtaining unit to obtain comment voice, delivered by participant, as voice data using the voice input device, and to register the obtained voice data to a voice database for each topic specified by a topic specification device from among a plurality of topics registered in a topic database in advance, and each comment-delivered participant identified from the voice data;
    a voice recognition unit to conduct a voice recognition process on the voice data registered in the voice database to obtain text information;
    a morphological analysis unit to conduct a morphological analysis on the text information obtained by the voice recognition unit, and to register a keyword extracted from words obtained by the morphological analysis unit to a keyword database with topic and comment-delivered participant registered to the voice database along with voice; and
    a display generation unit to display the keyword in a matrix while relating the keyword to a topic and a comment-delivering participant, wherein
    when a current comment is delivered while the topic is changed from one topic specified by the topic specification device to another unrelated topic, the display generation unit separately displays a keyword obtained from new voice data for the another unrelated topic in a specific area in the matrix.

2. The comment recording apparatus of claim 1, wherein the topic database stores information set for each topic.

3. The comment recording apparatus of claim 1, wherein the keyword is a noun included in the text information.

4. The comment recording apparatus of claim 1, wherein the display generation unit displays a sentence consisting of the keyword displayed in the matrix and a given number of other words present before the keyword, after the keyword, or both before and after the keyword.

5. The comment recording apparatus of claim 1, wherein the display generation unit displays a sentence consisting of the keyword displayed in the matrix and a given number of other words present before the keyword, after the keyword, or both before and after the keyword, the comment recording apparatus further comprising:
- a real time measuring device to measure real time of each voice; and
- a voice playback unit to play back the voice data registered in the voice database by using the voice output device,
- wherein the voice obtaining unit obtains the voice data with a start time of each voice based on a measurement result by the real time measuring device,
- the morphological analysis unit obtains the start time of each word in the voice data, and
- the voice playback unit plays back the voice data based on the start time of each word of the sentence.

6. The comment recording apparatus of claim 1,
- wherein the topic database stores an explanation sentence for each topic in advance, and when the keyword displayed in the specific area matches a word in the explanation sentence for each topic obtained by conducting a morphological analysis by using the morphological analysis unit, the display generation unit displays the matched word as the keyword at a position corresponding to a corresponding topic in the matrix.

7. The comment recording apparatus of claim 1, wherein a new topic is added to the topic database based on a keyword displayed in the matrix.

8. The comment recording apparatus of claim 1, further comprising an input unit to input a level of importance and/or relatedness of keyword, displayed in the matrix, to a topic.

9. The comment recording apparatus of claim 1, wherein a keyword displayed in the matrix is delete-able, and when a keyword is deleted, the voice recognition unit re-conducts the voice recognition process.

10. A comment recording method using a comment recording apparatus for recording comment voice and playing back recorded comment voice, the comment recording apparatus including circuitry, the method comprising the steps of:
- registering voice data in a voice database for each topic specified by a topic specification device from among a plurality of topics registered in a topic database in advance, and each comment-delivering participant identified from the voice data;
- obtaining text information by conducting a voice recognition process on the voice data registered in the voice database by using the circuitry;
- conducting a morphological analysis on the text information and extracting a keyword from words obtained by the morphological analysis;
- registering the keyword in a keyword database with topic and comment-delivering participant registered to the voice database along with voice; and
- displaying the keyword in a matrix by using the circuitry while relating the keyword with a topic and a comment-delivering participant, and when a current comment is delivered while the topic is changed from one topic specified by the topic specification device to another unrelated topic, separately displaying a keyword obtained from new voice data for the another unrelated topic in a specific area in the matrix.

11. A non-transitory computer-readable medium storing a program for recording comment voice using a comment recording apparatus for recording comment voice, and playing back the recorded comment voice, the comment recording apparatus including circuitry, the program comprising instructions that when executed by a computer cause the computer to execute a method of recording and playing back comment voice using the comment recording apparatus, the method comprising the steps of:
- registering voice data in a voice database for each topic specified by a topic specification device from among a plurality of topics registered in a topic database in advance, and each comment-delivering participant identified from the voice data;
- obtaining text information by conducting a voice recognition process on the voice data registered in the voice database by using the circuitry;
- conducting a morphological analysis on the text information and extracting a keyword from words obtained by the morphological analysis;
- registering the keyword in a keyword database with topic and comment-delivering participant registered to the voice database along with voice; and
- displaying the keyword in a matrix by using the circuitry while relating the keyword with a topic and a comment-delivering participant, and when a current comment is delivered while the topic is changed from one topic specified by the topic specification device to another unrelated topic, separately displaying a keyword obtained from new voice data for the another unrelated topic in a specific area in the matrix.

* * * * *